United States Patent [19]

Suzuki

[11] Patent Number: 4,493,648

[45] Date of Patent: Jan. 15, 1985

[54] TERRESTRIAL GLOBE

[76] Inventor: Hajime Suzuki, 5-39-9 Kamikitazawa, Setagaga-ken, Tokyo, Japan

[21] Appl. No.: 493,718

[22] Filed: May 11, 1983

[30] Foreign Application Priority Data

May 17, 1982 [JP] Japan ............... 57-70615[U]
Mar. 15, 1983 [JP] Japan ............... 58-36306[U]

[51] Int. Cl.³ .................................. G09B 27/08
[52] U.S. Cl. .................... 434/136; 40/473; 192/40
[58] Field of Search .............. 434/136; 40/473; 192/40, 53 D

[56] References Cited

U.S. PATENT DOCUMENTS

| 2,209,858 | 7/1940 | Steirt ............. 40/473 X |
| 2,555,215 | 5/1951 | Warner ............. 192/40 X |
| 3,049,813 | 8/1962 | List ............. 434/136 |
| 3,086,299 | 4/1963 | Wilkerson ............. 434/136 |

Primary Examiner—William H. Grieb
Attorney, Agent, or Firm—Abelman, Frayne Rezac & Schwab

[57] ABSTRACT

A rotatable globe has a drive motor supported by a stationary shaft, the drive motor being positioned entirely within the globe and having switching means actuated by manual rotation of the globe.

4 Claims, 11 Drawing Figures

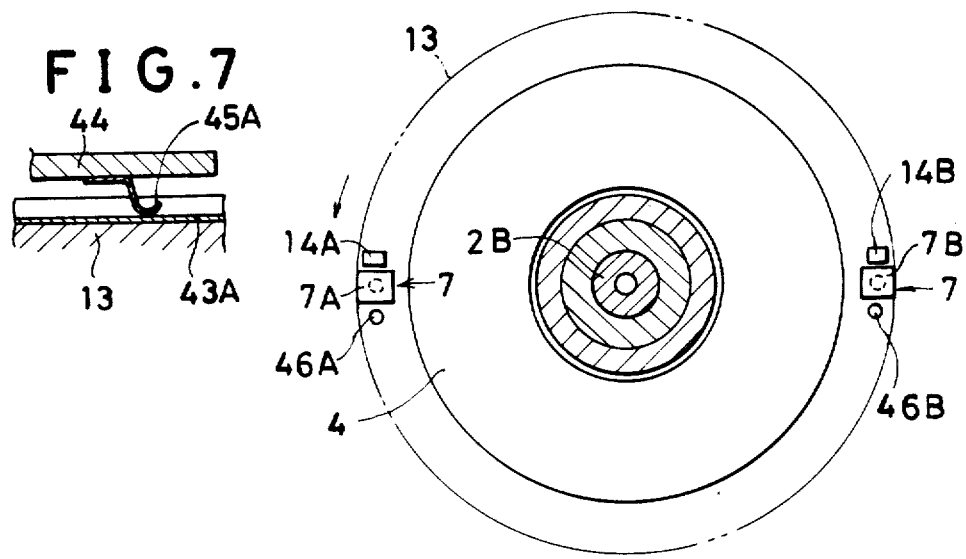
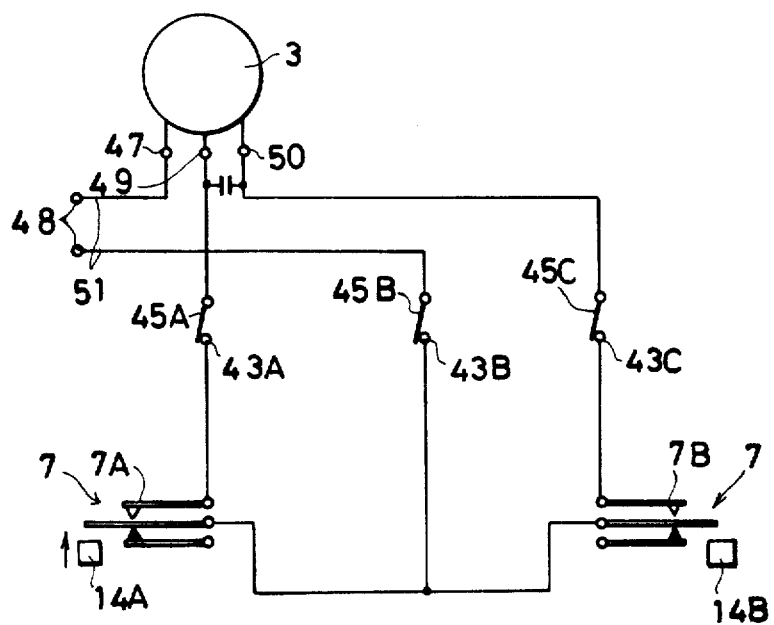

TERRESTRIAL GLOBE

FIELD OF THE INVENTION

This invention relates to a support for a terrestrial globe of the type including a hollow spheroidal body which is mounted for rotation about a diametral axis.

BACKGROUND OF THE INVENTION

Terrestrial globes are known in which a hollow spheroidal body, usually of plastics material, is printed or appliqued on its outer surface with a representation of the earth's land and water masses. The spheroid or globe is provided with pivots on its axis depicting the respective poles, and usually is pivotally supported in a C-shaped yoke or frame, the frame itself being supported to correctly represent the orientation of the earth's poles.

Such globes are supported by their pivots for free and unrestricted rotation about the axis of the pivots, thus permitting ready acess to any particular section of the face of the globe for easy viewing.

Such globes are manually rotated, or, if motor driven, the drive motor is arranged exteriorly of the globe and attached to the frame, the motor being connected to rotate the globe or one of the pivots supporting the globe.

THE INVENTION CONCEPT

This invention teaches a terrestrial glove of the type referred to, in which the globe is rotatable by a drive motor contained entirely within the globe, and which is totally hidden from view by the globe itself.

Further, the invention teaches a motorized globe having manually actuable switching devices for the drive motor which are actuated by manual initiation of rotation of the globe, or, by the manual stopping of the rotation thereof.

The invention also teaches a motorized globe in which an override is provided for the drive motor, thus permitting direct manual rotation of the globe to any desire position about its longitudinal axis.

To these ends, the terrestrail globe of the invention is provided with an aperture in its surface of an extent sufficient permit insertion of a drive motor into the interior of the globe, the drive motor being supported by a stationary pivot providing a support for the globe, the pivot also providing for the feed of electrical power to the motor to energize it.

The motor is connected to drive the globe through a slipping clutch whereby the globe can be manually rotated at will, the driven element of the slipping clutch or a member fast therewith employed to transmit manual rotation of the globe to a switching mechanism to engage or disengage the electrical power supply to the motor.

While the support of the present invention finds particular utility in a support for a terrestrial globe, the support also finds utility in the support of other rotatable spherodial bodies in which it is required that the drive motor shall not be exposed to view, such as in light reflecting mirrored balls, or in decorative lighting where it is required that the globe rotate, or in advertising devices in which the rotating globe carries advertising legends or indicia.

DESCRIPTION OF THE DRAWINGS

Embodying examples of the invention will now be explained with reference to the accompanying drawings, in which:

FIGS. 7 and 8 are sectional views taken along the lines VII-VII and VIII-VIII, respectively in FIG. 6;

FIG. 9 is a diagram showing an electric circuit thereof;

DESCRIPTION OF THE PREFERRED EMBODIMENTS

Figure 1:
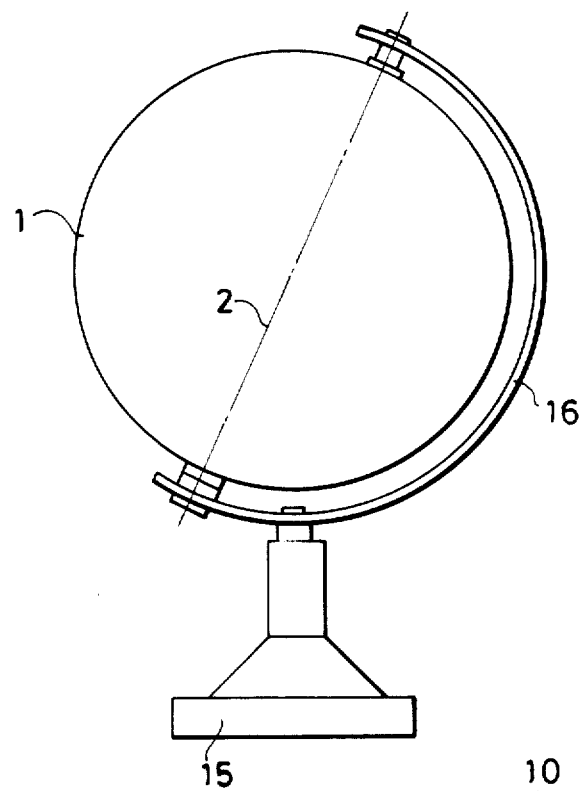
FIG. 1 is a side view of one example of the terrestrial globe of this invention.
Figure 3:
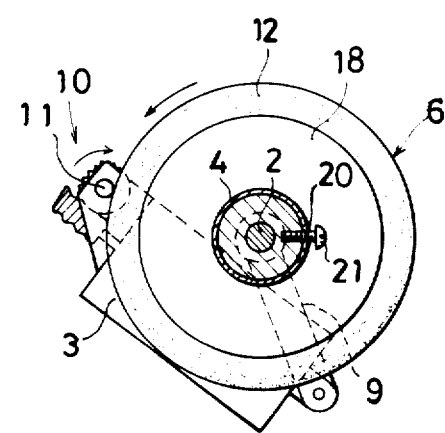
FIGS. 3 and 4 are sectional views taken along the lines III-III and IV-IV, respectively, in FIG. 2.

Referring to FIGS. 1 to 4, numeral 1 denotes a globe body which is rotatably supported on a stationary axial shaft 2 extending through the globe body 1. The stationary shaft 2 is held in an oblique position of 23.5 degrees to the vertical by end portions of a circular arc-shaped holder 16 fixed to a base member 15.

The shaft 2 supports a driving unit comprising an electric motor 3 and a rotary member 4 driven by the motor 3. More in detail, the electric motor 3 is pivotally supported on an arm 9 which is supported by the stationary axial shaft 2. A rotary plate 12 of rubber or the like constituting a friction clutch, and a rotary plate 18 of metal or the like which is in frictional contact with the plate 12, serves as a limited torque clutch 6.

A spring 17 secured at one end of the stationary shaft 2 provides the engaging force for the clutch. A driving shaft 11, connected through a gear transmission mechanism 10 to an output shaft of the motor 3, engages the periphery of the plate 12 under the influence of the weight of the motor 3.

The rotary member 4 is tubular, and has one end thereof mounted on a boss 19 of the rotary plate 18, and secured thereto by a screw 21 secured in the boss 19 and extending through a slit 20 in the end of the member 4. The other end of the rotary member 4 is threaded onto a boss 5A of a connecting member 5, which is mounted in an opening 22 of the globe body 1 and is secured by a nut 5B, the connecting member 5 being rotatable on the stationary shaft 2 and providing one of the supports for the globe body 1.

A switch 7 for the motor 3 is arranged as to be closed when the globe body 1 is rotated manually in one direction (the direction of rotation of the earth), and to be opened either when the globe body 1 is stopped or when it is manually rotated in the reverse direction. The switch 7 includes a metallic plate 25 fixedly mounted on one end of a bobbin 23 fast with the stationary shaft 2, the plate 25 being connected to the electric motor 3 by a wire 24. A contact member $7C_2$ is urged into pressure contact with the metallic plate 25 by a spring 26. A contact member $7C_1$ is brought into contact therewith an is separated therefrom to make and break the circuit of the motor. This contact member $7C_1$ is fixed to a partial member 1A of the globe body 1, and is connected electrically to one electrode of a battery 29; along with the partial member 1A, through a boss 27 of the globe body 1, and a spacer 28 and the holder 16, which are made of electrically conductive material. The battery 29 is contained in a bottom portion of the base member 15. Numeral 31 denotes an electric wire which is provided in a hollow portion 32 of the stationary shaft 2 and a grooved portion 33 of the holder 16 for connecting the motor 3 to the other electrode of the battery 29.

Figure 4:
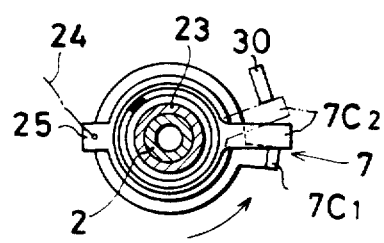

When the globe body 1 is rotated in the direction shown by the arrow in FIG. 4, the contact member $7C_1$ is brought into contact with the contact member $7C_2$, and thereby the driving circuit for the motor 3 is closed. When the globe body 1 is rotated in the reverse direction, an electrically non-conductive member 30 carried by the partial member 1A of the globe body 1, and which faces the contact member $7C_1$ with a predetermined interval left therebetween, engages the contact member $7C_2$ and rotates the contact member relatively to the plate 25, the respective members slipping relatively to each other.

The circumferential edge of the partial member 1A of the globe body 1 and the circumferential edge of the corresponding opening 8 of the globe body 1 are formed with respective shoulder portions so that no difference in height therebetween is produced when the two are engaged one with another, and thereby a continuous map may be provided on the globe body 1 including the partial member 1A.

For assembling the terrestrial globe having the foregoing construction, first the spacer 28, the boss 27, the partial member 1A of the globe body 1, the driving switch 7, the motor 3, the limited torque joint 6, the rotary member 4 and the main part 5A of the connecting member 5 are mounted on the stationary shaft 2, and then the shaft 2 thus prepared is inserted into the globe body 1 through the opening 8 thereof. The threaded portion of the main part 5A of the connecting member 5 is protruded through the opening 22 of the globe body 1, and is fixed to the globe body 1 by means of the nut 5B. Thereafter, an upper threaded end of the stationary shaft 2 is fixed by means of a nut to an upper end portion of the holder 16, and similarly the lower end thereof is fixed to a lower end portion of the holder 16. The mutually engaged circumferential edges of the partial member 1A and of the opening 8 of the globe body need not be adhered together, because the two are in frictional engagement one with another due to application of the weight of the globe body 1. By this construction, the undivided globe body 1 can be supported directly on the stationary shaft 2. Also thereafter, if necessary, the internal parts thereof can be replaced without dividing the globe body 1 into parts. Additionally the appearance is good because all the parts are contained in the globe body.

The operation of this embodying example will now be explained.

In the stationary condition of the globe, the contact members $7C_1$ and $7C_2$ of the driving switch 7 are spaced one from another. If the globe body 1 is rotated manually in the direction shown by the arrow in FIGS. 3 and 4, the contact member $7C_1$ is then brought into contact with the contact member $7C_2$ and thereby the circuit for the motor 3 is closed. The motor 3 rotates and the rotation thereof is transmitted through the limited torque joint 6 and the rotary member 4 to the globe body 1. As the globe rotates, the contact member $7C_1$ will rotate the contact member $7C_2$ relative to the contact plate 25 and will maintain the circuit closed. If the globe body 1 is manually rotated in the same direction at a speed above the rotation speed, the rotary plate 18 will slip relatively to plate 12 so that the globe body 1 can be rotated with a comparatively light force.

If the globe body 1 is stopped manually, the contact member $7C_2$ remains in contact with the contact member $7C_1$, so that rotation of the globe body 1 can be resumed on release of the globe. If the globe body 1 forcibly rotated manually a little in the reverse direction, the contact member $7C_1$ is separated from the contact member $7C_2$, and the motor 3 is disconnected and is stopped. The globe body 1 in its stopped condition can be rotated manually in the reverse direction, only a light force being required due to the interposition of the limited torque joint 6. As the globe body 1 can be manually rotated by a comparatively light force from its rotating condition and from its stop condition, any desired region of the map on the globe body 1 can be rapidly moved to a position for observation.

The switch 7 may be modified so that either one of the two contact members $7C_1$, $7C_2$ is replaced by a supporting member, and a microswitch or a photo electric switch is fixedly provided thereon, the other contact member being replaced by an actuator for operating the microswitch or the photoelectric switch.

Figure 5:
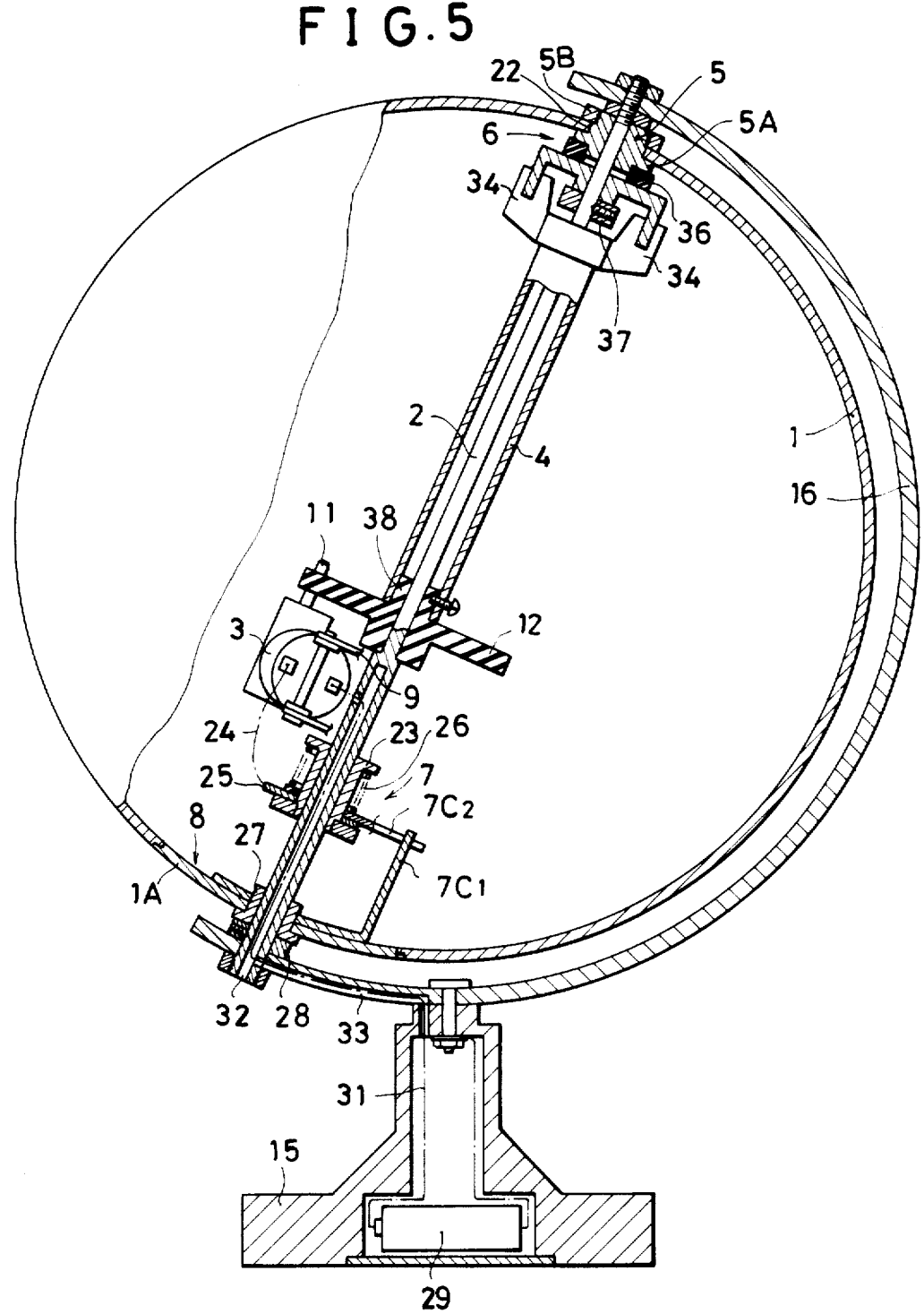
FIG. 5 is a sectional side view of another example thereof.

The limited torque joint 6 has been interposed between the globe 1 and the rotary member 4 and the motor 3 in the foregoing example, but it may be so modified that the limited torque joint 6 is interposed between the rotary member 4 and the connecting member 5 as shown, for instance, in FIG. 5.

In this example, the limited torque joint 6 comprises a rotary plate 35 of metal or the like which is rotatably mounted at its boss portion on the stationary shaft 2 and has a pair of groove members receiving wing-shaped members 34, 34 formed on the upper end of the rotary member 4. An annular friction member 36 is fixed to the inner end of the main part 5A of the connecting member 5. In order that the rotary plate 35 and the annular friction member 36 may be brought into frictional engagement, the rotary plate 35 is regulated in its position by a supporting member 37 fixed to the stationary shaft 2. Thus, the rotary plate 35 is in engagement at the pair of groove members with the wing-shaped members 34, 34 on the upper end of the rotary member 4, and the lower end of the rotary member 4 is fixed to a boss portion 38 of the friction rotary plate 12, which is in pressure contact with the driving shaft 11.

This arrangement operates in a similar manner to the preceeding example, and the same operations can be obtained.

In another embodying example as shown in FIGS. 6 to 9, the stationary shaft 2 comprises upper and lower separate shaft portions 2A, 2B fixed respectively to the upper and lower end portions of the holder 16. A motor base 38 having the motor 3 mounted thereon is attached to the upper end of the shaft portion 2B and a driving shaft 42 is rotatably mounted on the shaft portion 2B. A spur gear 40 is meshed with a pinion 39 mounted on the output shaft of the motor 3, and a friction plate 41 is fixed to the driving shaft 42.

A cooperation member 13 is rotatably mounted on the shaft 42. The rotary member 4 is connected through the connecting member 5 to the partial member 1A of the globe body 1, and is in pressure contact with the upper surface of the friction plate 41. The limited torque joint 6 is formed by the contact surfaces between the friciton plate 41 and the rotary member 4.

The contact surfaces between the cooperation member 13 and the friction plate 41 also provide a limited torque joint 6A by pushing the cooperation member 13 downwards by a spring 55. Thus, by rotating of the motor 3, the rotary member 4 and the cooperation member 13 are rotated simultaneously with each other through the pinion 39, the gear 40 and the friction plate 41, so that the globe body 1 is rotated.

If a manual force is applied to the globe to rotate globe body 1 at a speed higher than the existing rotary speed caused by the motor 3 or rotate the globe body 1 in the reverse direction, then, the rotary member 4 and the cooperation member 13 are both rotated slidably along the friction plate 14.

The cooperation member 13 is provided on its upper surface with three coaxial electric conductor rings 43A, 43B, 43C, and on its lower surface with the driving switch 7 for the motor 3 comprising a switch 7A for forward rotation and a switch 7B for reverse rotation. Resilient contact members 45A, 45B, 45C provided on a supporting member 44 and extending from the motor base 38 are in contact with the respective conductive rings 43A, 43B, 43C. (FIG. 7). The switches 7A, 7B for forward rotation and reverse rotation may comprise, for instance, microswitches, and are arranged to be operated by the abutment of operation members 14A, 14B provided on the rotary member 4.

As shown in FIG. 8, switches 7A, 7B are in such positions that they are not closed by the respective operation members 14A, 14B when the rotary member 4 and the cooperation member 13 are in their predetermined relative positions. If, from the condition of these relative positions, the globe body 1 and the rotary member 4 are rotated in a forward direction (the direction of an arrow), the switch 7A fixed to the stationary cooperation member 13 is closed by the operation member 14A. When the globe body 1 is rotated in the reverse direction, the switch 7B is closed by the operation member 14B.

Referring to FIG. 8, numerals 46A, 46B denote stops provided on the cooperation member 13 for the operation 14A, 14B. These stops 46A 46B are used for such a purpose that the operation member 14A, 14B, after closing the switches 7A, 7B, may be prevented thereby from being further rotated with consequential opening the switches 7A, 7B. These stops 46A, 46B may be omitted if the switches 7A, 7B themselves act also as stops.

Figure 6:
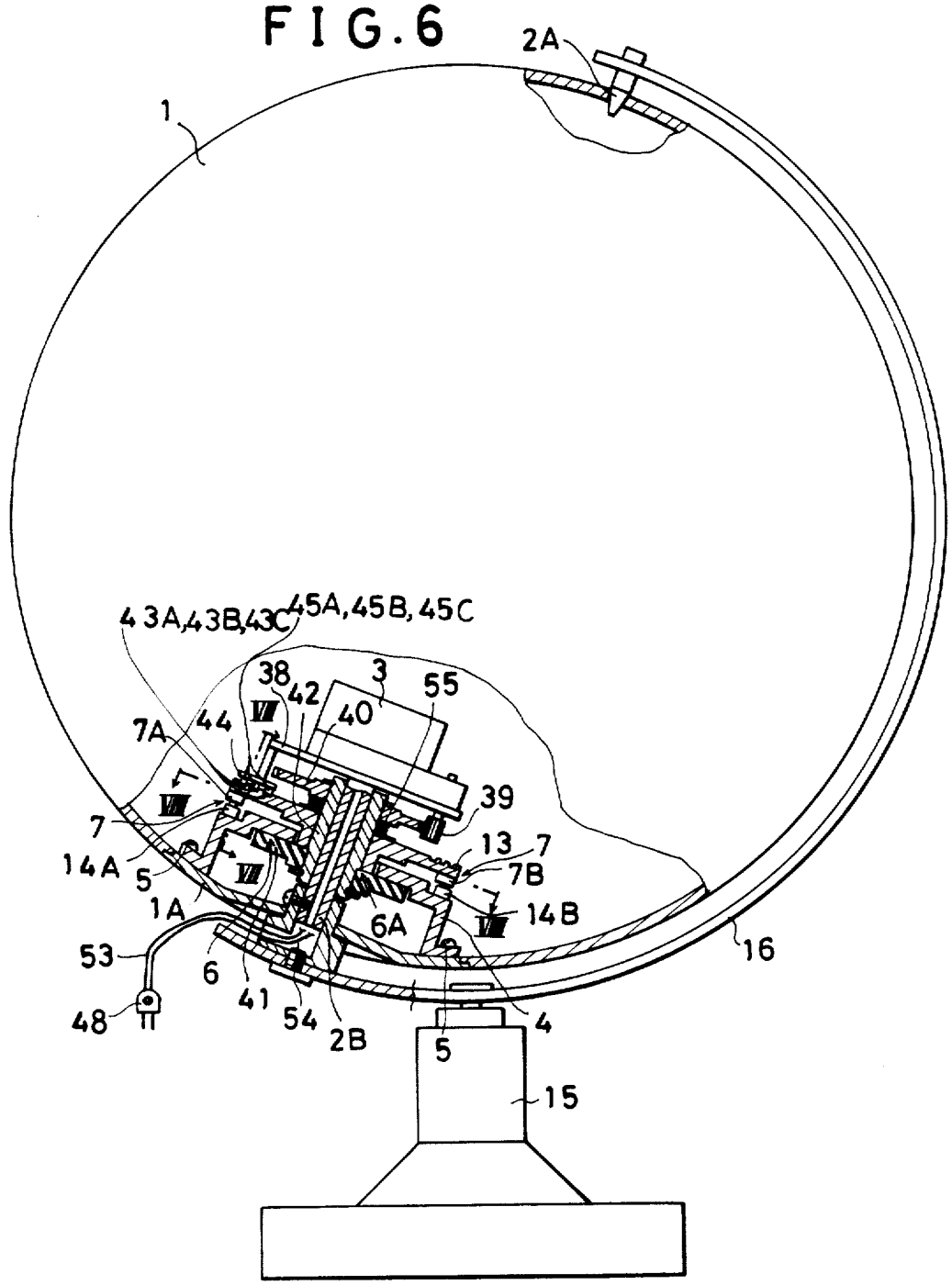
FIG. 6 is a side view, partly in section, of another example of this invention.

The motor 3 is a reversible type motor, and as shown in FIG. 9 has a common terminal 47 connected to one terminal of an electric power source 48, such as an external A.C. source or the like. A terminal 49 of the motor for forward rotation is connected to a stationary contact of the switch 7A through the resilient contact member 45A and the conductor ring 43A. A terminal 50 of the motor for reverse rotation is connected to a stationary contact of the switch 7B through the resilient contact member 45C and the conductor ring 43C. The movable contacts of the two switches 7A, 7B are connected to the other terminal of the power source 48. Numeral 53 denotes a power cord connected to the power source 48. The power cord 53 extends through a hollow portion 54 of the stationary shaft 2 as shown in FIG. 6.

The operation of this embodying example will now be explained.

When the rotary member 4 and the cooperation member 13 are in the relationship as shown in FIG. 8 and the driving switches 7A, 7B are both opened as shown in FIG. 9, the motor 3 and the globe body 1 are in a stop condition.

If the globe body is rotated manually in the forward direction (the direction of an arrow in FIG. 8), the rotary member 4 rotates while sliding on the friction plate 41, and the operation member 14A acts to close the switch 7A for forward rotation, because the pinion 39 has not yet been rotated. As a consequence, the forward rotation driving circuit for the motor 3 is closed, and the motor 3 is rotated in the forward direction. Thereby, the rotary member 4 together with the globe body 1 and the cooperation member 13 are rotated through the pinion 39 at the same speed in the forward direction.

If the globe body 1 is stopped by the application of manual torque above the predetermined limited torque, the limited torque joint 6 is then released in its engagement, and, consequently only the friction plate 41 is rotated (by the motor 3). Accordingly, the cooperation member 13 and the switch 7A for forward rotation continue to rotate, so that the engagement of the switch 7A with the operation member 14A is released, and the switch 7A is opened, and thereby the motor 3 is stopped. Accordingly, even when the operator's hand is removed from the globe body 1 thereafter, the globe body 1 remains in its top condition.

If the globe body 1 is rotated in the forward direction at a speed which is higher than the speed thereof given by the motor 3, the rotary member 4 and the cooperation member 13 are then both rotated while slipping on the friction plate 41 owning to the action of the action of the stop 46A. As a consequence, the globe body 1 can be rotated at the speed higher than the speed by the motor 3, without damaging the motor 3 or the driving mechanism thereof.

If the globe body 1 is rotated manually in the reverse direction, the operation member 14B on the rotary member 4 is brought into engagement with the switch 7B for the reverse rotation to close the same. Accordingly, the reverse rotation circuit for the motor 3 is closed, and the globe body 1 begins to rotate in the reverse direction by the motor 3. If the globe body 1 is forced to rotate manually in the reverse direction at a speed higher than the speed be the motor 3, it can do so in almost the same manner as in the case of forced forward rotation thereof.

.Though in this example the globe body 1 has been arranged to be rotated by the motor in both the forward and reverse directions, it may be arranged to be rotated by the motor in the forward direction alone as in the previous example. In this case, switch 7B and the operation member 14B which are used for the reverse rotation are omitted, and a stop for the reverse rotation of the operation member 14A is provided on the opposite side of the stop 46A on the cooperation member 13 so that it prevents the operation member 14A from separating from the driving switch 7A when the globe body 1 is rotated manually in the reverse direction.

Figure 10:
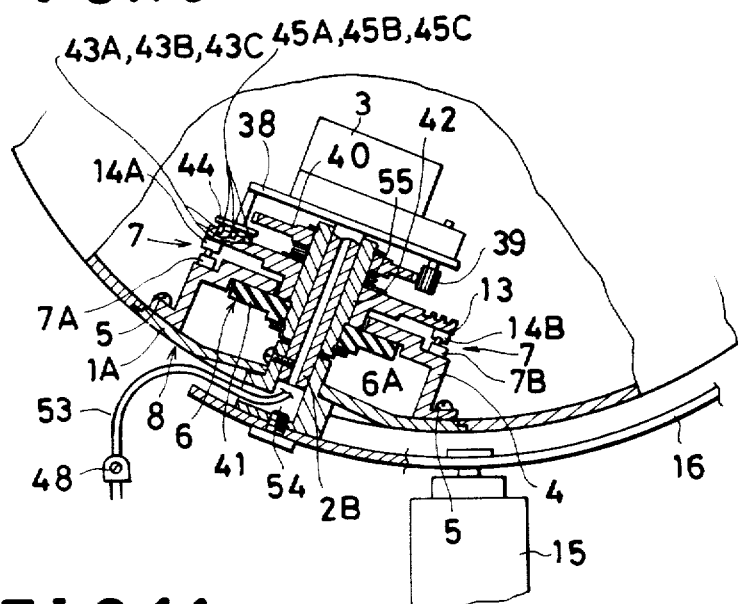
FIG. 10 is a sectional side view of an important portion of a modified example thereof; and, FIG. 11 is a sectional side view of an important portion of another modified example thereof.

In the example in FIG. 6, the driving switches 7A, 7B are provided on the cooperation member 13, and the operation members 14A, 14B are provided on the rotary member 4. This arrangement may be so modified that, as shown in FIG. 10, the driving switches 7A, 7B are provided on the rotary member 4 and the operation members 14A, 14B are provided on the cooperation member 13. This modification is applicable also to the case of the foregoing construction for forward regular directional rotation alone.

Figure 2:
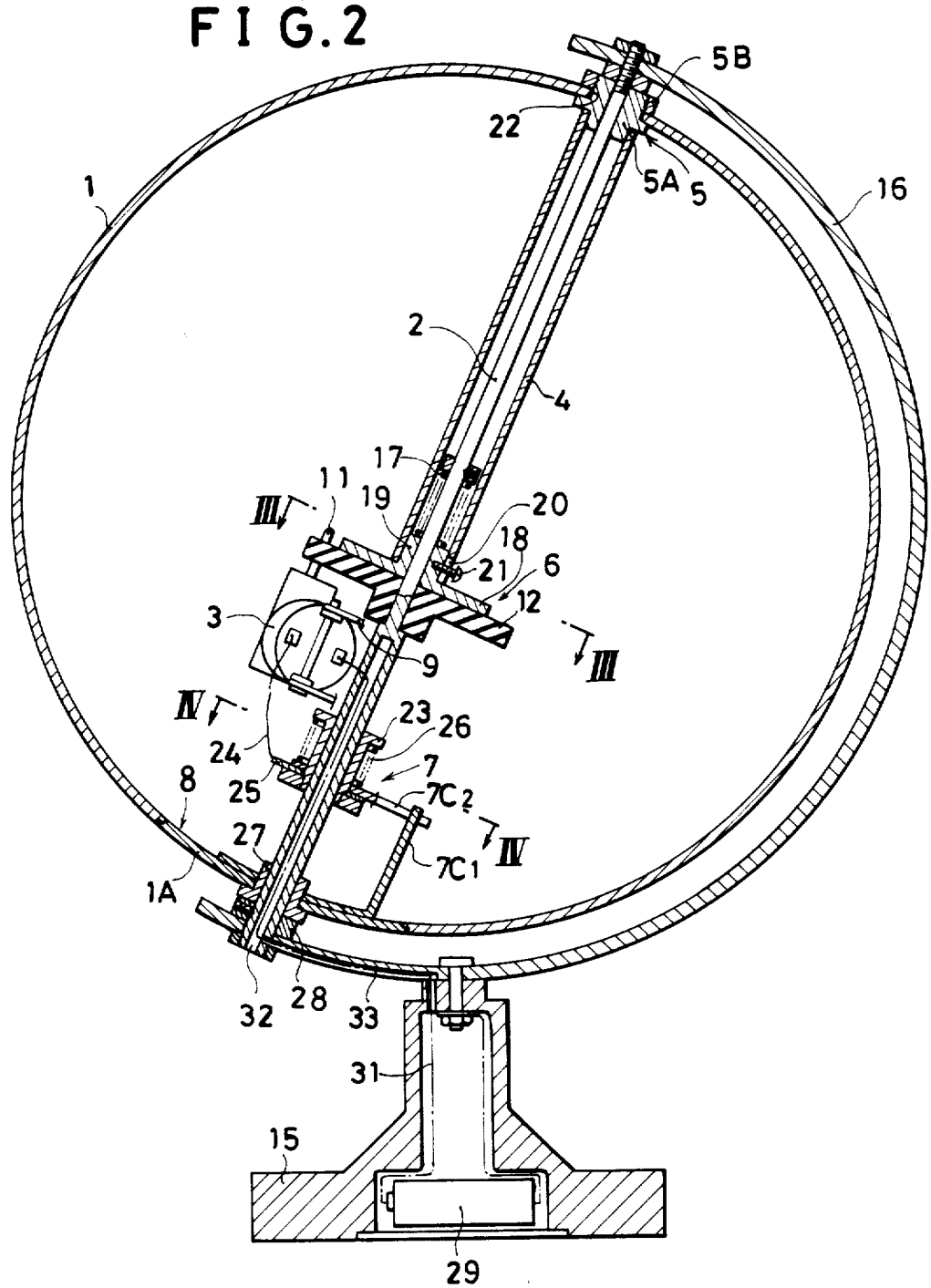
FIG. 2 is a sectional view of the same.

Furthermore, the structure may be so modified that the operation members 14A, 14B are omitted and a driving switch is used having one of the contact members 7C₁, 7C₂ attached to the rotary member 4 and the other contact member thereof attached to the cooperation member 13, in almost the same manner as in the case shown in FIG. 2.

Figure 11:
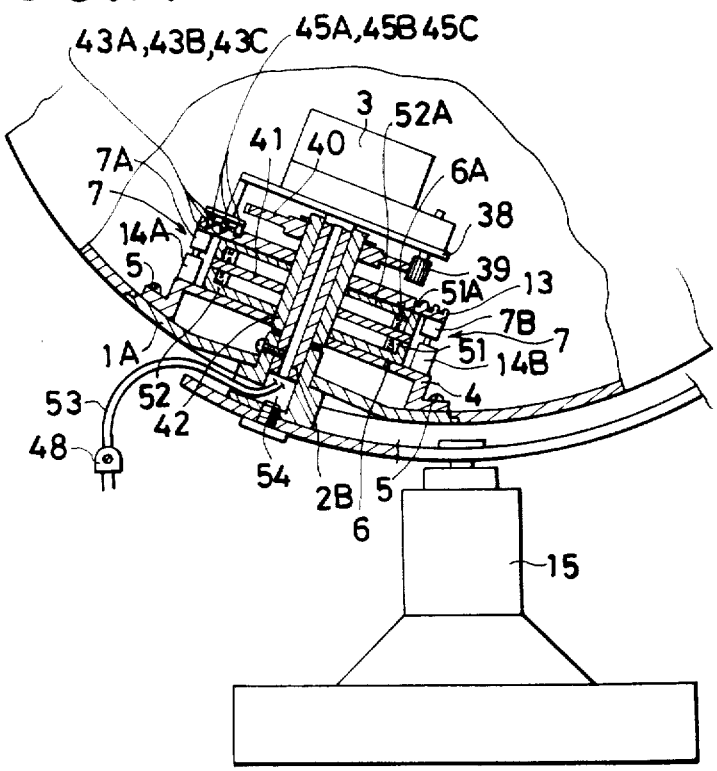

FIG. 11 shows an important portion of a modification of the example shown in FIG. 6, in which a friction clutch utilizing a magnetic force is used as the limited torque joint.

Referring to FIG. 11, the limited torque is provided by a friction plate 41 of magnetic material fixed to the driving shaft 42, and a ring shaped magnet 51 fixed to the lower surface of a friction place 41. A dish-shaped yoke member 52 of magnetic material is fixed to the rotary member 4, the yoke member 52 being attracted to the lower surface of the friction plate 41 by the magnetic flux of the magnet 51, and providing frictional engagement with the friction plate 41.

The limited torque joint 6A interposed between the friction plate 41 and the cooperation member 13 comprises a ring-shaped magnet 51A fixed to the upper surface of the friction plate 41, and a dish-shaped yoke member 52A of magnetic material fixed to the lower surface of the cooperation member 13. The yoke member 52A is attracted by the magnetic flux of the magnet 51A to the upper surface of the friction plate 41 and is frictionally engagement therewith.

The other constructions of this modified example are the same as those of the example shown in FIGS. 6 to 9.

I claim:

1. In a support for a rotatable globe, particularly a terrestrial globe, of the type including:
    a support;
    a pivot carried by the support;
    a globe supported by the pivot;
    a stationary shaft carried by said support and extending into the globe through an aperture therein;
    a drive motor positioned within said globe and supported by said stationary shaft;
    a drive member positioned within said globe and journaled for rotation about said stationary shaft, the drive member being driven by said drive motor; and,
    means for interconnecting said drive member and said globe and supporting said globe for rotation about a diametral axis thereof upon energization of said drive motor;
    the improvement comprising:
    switching means for said motor associated with said drive member and which is actuated to energize said motor upon manual rotation of said globe in a forward direction, and, which is actuated oppositely to de-energize said motor upon reverse manual rotation of said globe.

2. The support of claim 1, in which said switch means includes a first contact member rotatable with said globe, and a cooperating second contact member mounted rotatably on said stationary shaft.

3. In a support for a rotatable globe, particularly a terrestrial globe, of the type including:
    a support;
    a pivot carried by the support;
    a globe supported by the pivot;
    a stationary shaft carried by said support and extending into the globe through an aperture therein;
    a drive motor positioned within said globe and supported by said stationary shaft;
    a drive member positioned within said globe and journaled for rotation about said stationary shaft, the drive member being driven by said drive motor; and,
    means interconnecting said drive member and said globe and supporting said globe for rotation about a diametral axis thereof upon energization of said drive motor;
    the improvement comprising:
    switching means interposed between said interconnecting means and said drive member and actuated thereby upon manual rotation of said globe in either direction, said switch means being connected to energize said drive motor for rotation in an appropriate direction for rotating said globe in the same direction as the direction of manual movement of the globe, and to de-energize said motor upon manual restraint against further rotation of said globe.

4. The support of claim 3, in which said switch means is supported by one of said drive member and a member rotated by said interconnecting means, and a slipping clutch is interposed between said rotatable member and said interconnecting means.

* * * * *